United States Patent [19]

Rizzuto

[11] Patent Number: 4,938,411

[45] Date of Patent: Jul. 3, 1990

[54] SKIRT FOR ICE CREAM CONES

[75] Inventor: Peppino Rizzuto, Stevens Point, Wis.

[73] Assignee: Apix International, Division of Worzalla Publishing Co., Stevens Point, Wis.

[21] Appl. No.: 331,142

[22] Filed: Mar. 31, 1989

[51] Int. Cl.$^5$ .................. B65D 75/00; B65D 81/34
[52] U.S. Cl. .................. 229/1.5 H; 220/85 R; 220/90.2; 229/DIG. 7; 426/132; 426/139
[58] Field of Search .................. 220/90, 90.2, 90.4, 220/85 H, 85 R; 229/DIG. 7, 1.5 H; 426/95, 132, 139

[56] References Cited

U.S. PATENT DOCUMENTS

| D. 107,761 | 1/1938 | Fair . | |
|---|---|---|---|
| 1,176,932 | 3/1916 | Smith | 229/DIG. 7 |
| 1,616,570 | 2/1927 | Boynton . | |
| 1,800,759 | 4/1931 | Shean . | |
| 1,854,091 | 4/1932 | Young . | |
| 1,920,995 | 8/1933 | Legge . | |
| 2,074,278 | 3/1937 | Shapiro | 426/139 |
| 2,105,027 | 1/1938 | Davis | 220/85 R |
| 2,321,519 | 6/1943 | Rubinoff . | |
| 2,948,452 | 8/1960 | Grogan et al. . | |
| 3,306,512 | 2/1967 | Pagnini . | |
| 3,897,579 | 7/1975 | Weinstein | 229/DIG. 7 |
| 4,226,355 | 10/1980 | Helfrich, Jr. . | |
| 4,718,594 | 1/1988 | Harazi . | |

Primary Examiner—Jimmy G. Foster
Attorney, Agent, or Firm—Foley & Lardner, Schwartz, Jeffery, Schwaab, Mack, Blumenthal & Evans

[57] ABSTRACT

A drip catching device is provided for use with ice cream cones, comprising a planar member formed from a liquid absorbing material. The planar member has a plurality of intersecting slits formed therein for receiving a cylindrical or tapered ice cream cone. When the drip catching device is fitted around the ice cream cone, stresses which are set up in the drip catching device cause the planar member to take a substantially sinusoidal form and thereby fit snugly to the outer surface of the ice cream cone.

5 Claims, 1 Drawing Sheet

U.S. Patent   Jul. 3, 1990   4,938,411
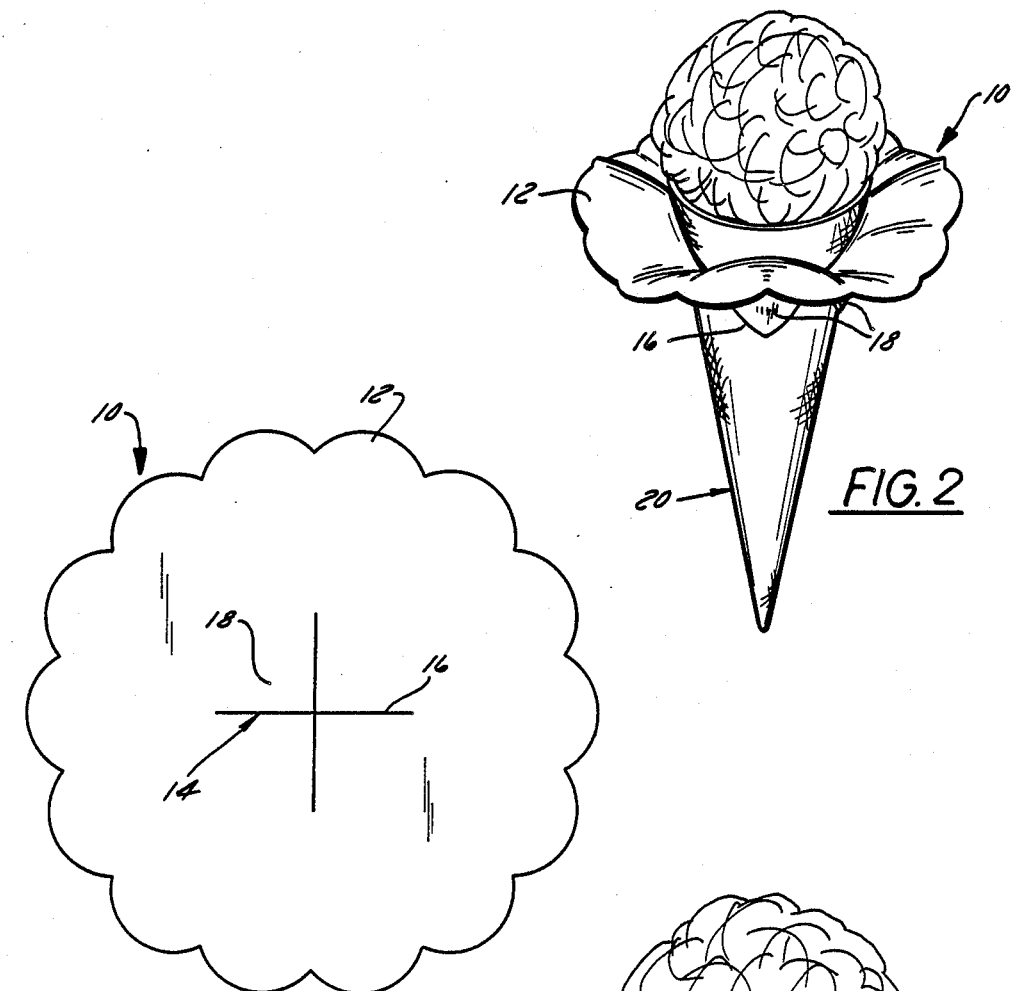
FIG. 1
FIG. 2
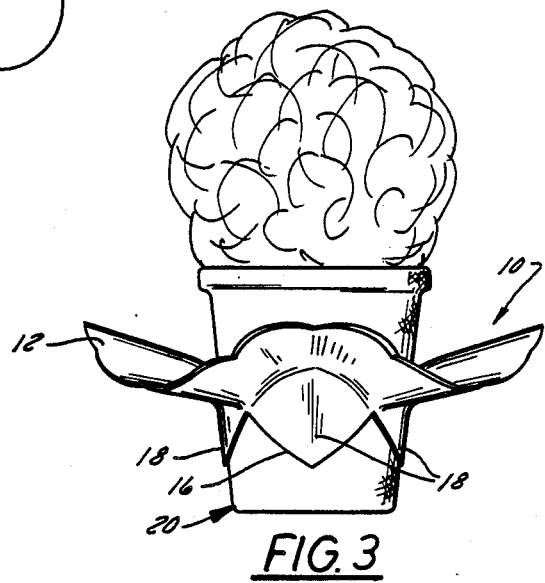
FIG. 3

SKIRT FOR ICE CREAM CONES

BACKGROUND OF THE INVENTION

1. Field of the Invention

This invention relates a drip catching device for use with ice cream cones, and more particularly to an ice cream cone skirt for protecting a user's hand from melted ice cream.

2. Discussion of the Related Art

Drip catching devices for ice cream cones are well-known in the art. For example, Grogan (U.S. Pat. No. 2,948,452) discloses a polyethylene drip catching device which has a conical portion to fit around the edible ice cream cone and a drip catching tray integral with the conical portion. Similarly, Harazi (U.S. Pat. No. 4,718,594) discloses a relatively complex structure wherein the plastic drip catching tray extends into the interior of the cone so that melted ice cream will be retained in the ice cream cone.

These drip catching devices suffer numerous disadvantages, however. Since drip catching devices have a very elastic demand curve, production cost must be maintained as low as possible. In other words, since consumers and ice cream distributors are relatively indifferent to the type of drip catching device they use, they will generally not be willing to pay even a few pennies more for a superior drip catching device. Thus, the truly superior drip catching device is one which performs all of the needed drip catching functions, while minimizing production cost.

It has been attempted, for example, to minimize cost by making the drip catching device out of cheaper materials, such as waxed paper or corrugated cardboard. Thus, Shean (U.S. Pat. No. 1,800,799) uses a waxed paper ice cream cone holder which completely envelops the lower portion of the ice cream cone. Boynton (U.S. Pat. No. 1,616,570) uses a flared ice cream cone extension which fits around the cone to protect the user's hand. This device, while simpler than others, suffers the disadvantage that it must be squeezed against the outer sides of the cone by the user's fingers in order to prevent ice cream from dripping down the outside of the cone.

SUMMARY OF THE INVENTION

Accordingly, the object to this invention is to provide a drip catching device which may be cheaply and easily produced.

The further object of this invention is to provide a drip catching device which snugly fits around the outside of an ice cream cone without requiring pressure from the user's fingers.

Another object of this invention is to provide an ice cream skirt which may be used with different sizes and shapes of ice cream cones, whether generally cylindrical or tapered.

Still a further object of this invention is to provide a drip catching device formed from a material which prevents bleed-through.

According to the present invention, the foregoing and additional objects are obtained by providing a drip catching device for use with ice cream cones, comprising a planar member formed from a liquid absorbing material. The planar member has a plurality of intersecting slits formed therein for receiving a cylindrical or tapered ice cream cone. When the drip catching device is fitted around the ice cream cone, stresses which are set up in the drip catching device cause the planar member to take a substantially sinusoidal form and thereby fit snugly to the outer surface of the ice cream cone.

Further advantages of this invention will become apparent hereinafter in the specification and drawings which follow.

BRIEF DESCRIPTION OF THE DRAWINGS

FIG. 1 is a top view of drip catching device according to the present invention;

FIG. 2 is a perspective view of drip catching device fitted around a tapered ice cream cone, according to the present invention; and FIG. 3 is a side view of a drip catching device fitted around a cylindrical cone.

DETAILED DESCRIPTION OF THE PREFERRED EMBODIMENTS

As illustrated in FIG. 1, the present invention comprehends a drip catching device 10 comprising a substantially planar member 12 which can be formed of a liquid absorbing material, such as webbed paper. At the center of the substantially planar member 12 is formed a cross-cut aperture 14 having a plurality of slits 16. The intersection of slits 16 form a plurality of deformable flaps 18.

Referring now to FIG. 2, there is shown a drip catching device 10 disposed about a tapered ice cream cone 20 having a circular cross-section. As can be seen, the insertion of the cone 20 into cross cut aperture 14 causes slits 16 to separate from each other and deformable flaps 18 to fit snugly against the surface of the cone 20. Additionally, it has been found that when the drip catching device 10 is fitted around the cone 20, stresses are set up in the substantially planar member 12 which causes the planar member 12 to take on a substantially sinusoidal shape, as shown in FIG. 2. This sinusoidal shape aides in maintaining a snug fit of the drip catching device 10 about the cone 20, so that the drip catching device need not be held against the cone by the user's fingers.

As shown in FIG. 3, the drip catching may be also used with generally cylindrical cones, thereby providing maximum flexibility for the vendor. The use of the device is generally the same as described above with regard to tapered cones.

Extremely beneficial results have been obtained by forming the substantially planar member from a liquid absorbing material such as webbed paper. It has also been found particularly advantageous to use non-woven material, laminates or partial impregnates, or other structures which prevent bleed-through.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

What is claimed is:

1. An ice cream cone, comprising:
   an edible ice cream holder having a circular cross section;
   a drip catching device disposed about said ice cream holder;

said drip catching device comprising a substantially sinusoidal portion caused by said ice cream holder and extending laterally from said ice cream holder, a plurality of flap sections contiguous with said ice cream holder, such that said drip catching device continuously contacts said edible ice cream holder along a circumferential portion thereof.

2. The ice cream cone according to claim 1, wherein said edible ice cream holder is tapered.

3. The ice cream cone according to claim 1, wherein said edible ice cream holder is generally cylindrical.

4. The ice cream cone according to claim 1, wherein said liquid absorbing material is webbed paper.

5. The ice cream cone according to claim 1, wherein said liquid absorbing material is laminated paper.

* * * * *